US011602789B2

United States Patent
Shibayama et al.

(10) Patent No.: US 11,602,789 B2
(45) Date of Patent: Mar. 14, 2023

(54) METAL-POWDER PRODUCING APPARATUS, AND GAS JET DEVICE AND CRUCIBLE CONTAINER THEREOF

(71) Applicant: Mitsubishi Heavy Industries, Ltd., Tokyo (JP)

(72) Inventors: Takashi Shibayama, Tokyo (JP); Shigenobu Eguchi, Tokyo (JP); Yuting Wang, Tokyo (JP); Shinya Imano, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 227 days.

(21) Appl. No.: 16/624,658

(22) PCT Filed: Dec. 7, 2018

(86) PCT No.: PCT/JP2018/045159
§ 371 (c)(1),
(2) Date: Dec. 19, 2019

(87) PCT Pub. No.: WO2019/112052
PCT Pub. Date: Jun. 13, 2019

(65) Prior Publication Data
US 2020/0215615 A1    Jul. 9, 2020

(30) Foreign Application Priority Data
Dec. 7, 2017    (JP) .............................. JP2017-235314

(51) Int. Cl.
*B22F 9/08*    (2006.01)
*F27B 14/10*   (2006.01)

(52) U.S. Cl.
CPC .............. *B22F 9/082* (2013.01); *F27B 14/10* (2013.01); *B22F 2009/088* (2013.01);
(Continued)

(58) Field of Classification Search
None
See application file for complete search history.

(56) References Cited

U.S. PATENT DOCUMENTS 3,009,205 A * 11/1961 Monson .............. B02C 19/0056
75/338
3,663,206 A *  5/1972 Lubanska ............... B22F 9/082
75/337
(Continued)

FOREIGN PATENT DOCUMENTS

| CN | 105903975 A | 8/2016 |
|----|-------------|--------|
| JP | 60-190502 A | 9/1985 |

(Continued)

OTHER PUBLICATIONS

English Translation of JP 04009409 (originally published Jan. 14, 1992) obtained from J-Plat Pat.*
(Continued)

*Primary Examiner* — George Wyszomierski
(74) *Attorney, Agent, or Firm* — Volpe Koenig

(57) ABSTRACT

A metal-powder producing apparatus includes a spray chamber, and a plurality of spray nozzles that liquid-spray a melted metal into the spray chamber. Each of the plurality of spray nozzles includes: a liquid nozzle that allows the melted metal to flow down into the spray chamber; and a gas-jet nozzle that has a plurality of gas-jet holes arranged
(Continued)

around the liquid nozzle and causing a gas fluid to collide with the melted metal having flowed down from the liquid nozzle.

10 Claims, 11 Drawing Sheets

(52) U.S. Cl.
CPC ............. *B22F 2009/0824* (2013.01); *B22F 2009/0848* (2013.01); *B22F 2999/00* (2013.01)

(56) References Cited

U.S. PATENT DOCUMENTS

| | | | |
|---|---|---|---|
| 4,272,463 A | 6/1981 | Clark et al. | |
| 5,749,938 A | 5/1998 | Coombs | |
| 2020/0246874 A1* | 8/2020 | Shibayama | B22F 9/082 |

FOREIGN PATENT DOCUMENTS

| | | | |
|---|---|---|---|
| JP | 04009409 A | * | 1/1992 |
| JP | 5-202404 A | | 8/1993 |
| JP | 05-202404 A | | 8/1993 |
| JP | 06-049512 A | | 2/1994 |
| JP | 6-49512 A | | 2/1994 |
| JP | 8-73905 A | | 3/1996 |
| JP | 08-073905 A | | 3/1996 |
| JP | 8-506382 A | | 7/1996 |
| JP | 2002-105514 A | | 4/2002 |
| JP | 2009-35801 A | | 2/2009 |
| JP | 2009-035801 A | | 2/2009 |
| JP | 2010-090421 A | | 4/2010 |
| JP | 2012-000592 A | | 1/2012 |
| JP | 2013-527311 A | | 6/2013 |
| JP | 2016-211027 A | | 12/2016 |

OTHER PUBLICATIONS

Definition of "vertex" from The American Heritage ® Dictionary of the English Language, Fifth edition, HarperCollins publishers, copyright 2022.*
Definition of "vertex" downloaded from Collinsdictionary.com/dictionary/English/vertex on Aug. 18, 2022.*
International Search Report for PCT/JP2018/045159, dated Feb. 19, 2019.
Canadian Office Action dated Apr. 21, 2021 for Canadian Patent Application No. 3,067,702.
Korean Office Action dated Nov. 23, 2020 for Korean Patent Application No. 10-2019-7036913.
Extended European Search Report dated Aug. 2, 2021 for European Patent Application No. 18885297.4.
Chinese Office Action dated Mar. 14, 2022 for the Chinese Patent Application No. 201880078393.4.
International Preliminary Report on Patentability dated Jun. 9, 2020 for PCT International Application No. PCT/JP2018/045159.
English concise explanation of the relevance provided by English translation of the Written Opinion dated Jun. 9, 2020 for PCT International Application No. PCT/JP2018/045159), of Document 4 of Opinion.

* cited by examiner

MULTI-HOLE AIR CURTAIN

SLIT AIR CURTAIN

GAS HOLE TILT

FIG. 16

| | | FIRST EXAMPLE | SECOND EXAMPLE | THIRD EXAMPLE | FOURTH EXAMPLE | FIFTH EXAMPLE | SIXTH EXAMPLE | COMPAR-ATIVE EXAMPLE |
|---|---|---|---|---|---|---|---|---|
| GAS FLOW PATH | | INDEPEN-DENT | SHARED | SHARED | SHARED | SHARED | SHARED | SHARED |
| DIFFERENCES IN SPRAY CONDITION AT EACH SPRAY NOZZLE | (1) JETTING GAS PRESSURE | 1.5-FOLD | — | — | — | — | — | — |
| | (2) ANGLE OF GAS JET HOLES | — | 10° SMALLER | — | — | — | — | — |
| | (3) HOLE DIAMETER OF GAS JET HOLES | — | — | 2-FOLD | — | — | — | — |
| | (4) NUMBER OF GAS JET HOLES | — | — | — | 2-FOLD | — | — | — |
| | (5) ORIFICE DIAMETER OF LIQUID NOZZLE | — | — | — | — | 1.5-FOLD | — | — |
| | (6) TIP-SHAPE ANGLE OF LIQUID NOZZLE | — | — | — | — | — | 20° LARGER | — |
| DIFFERENCES IN PARTICLE SIZE (DIFFERENCES FROM REFERENCE SPRAY NOZZLE) | | FINE PARTICLES | COARSE PARTICLES | FINE PARTICLES | FINE PARTICLES | COARSE PARTICLES | COARSE PARTICLES | — |

METAL-POWDER PRODUCING APPARATUS, AND GAS JET DEVICE AND CRUCIBLE CONTAINER THEREOF

TECHNICAL FIELD

The present invention relates to: a metal-powder producing apparatus that produces a fine-particle metal (metal powders) by causing a high-pressure gas fluid to collide with a melted metal flowing down from a liquid nozzle; and a gas jet device and crucible container thereof.

BACKGROUND ART

There is atomization including gas atomization and water atomization as methods for producing a fine-particle metal (metal powders) from a melted metal. In gas atomization, a melted metal is caused to flow down from a liquid nozzle located at a lower portion of a melting chamber storing a melted metal, and an inert gas is blown to the liquid from a plurality of gas-jet nozzles arranged around the liquid nozzle. The flow of the melted metal from the liquid nozzle is fragmented by the inert gas flow from the gas-jet nozzles into a large number of fine metal droplets to fall in a spray chamber, and gets solidified while at the same time being spheroidized due to surface tension. Thereby, the spherical metal powders are collected by a hopper located at a bottom portion of the spray chamber.

For example, JP-2016-211027-A discloses a metal-powder producing apparatus including: a crucible that is provided at an upper portion of a spray chamber (spray chamber), and retains a liquid; an atomizing nozzle that is connected to a bottom portion of the crucible and allows the liquid to fall in the spray chamber while at the same time blowing the inert gas to the liquid; a gas inlet and gas outlet for performing gas replacement in the spray chamber; and a second gas inlet that provides a gas for making an inner space of the spray chamber oxidizing atmosphere and/or nitriding atmosphere.

PRIOR ART DOCUMENT

Patent Document

Patent Document 1: JP-2016-211027-A

SUMMARY OF THE INVENTION

Problem to be Solved by the Invention

The demand for particle sizes of metal powders which are smaller than those conventionally demanded for atomization has been growing in recent years as represented by the demand for such metal powders as materials for metal 3D printers that manufacture metals with desired shapes by additively manufacturing of a large amount of metal particles. Particle sizes of metal powders conventionally used in powder metallurgy, welding, and the like are approximately 70 to 100 μm, for example, but particle sizes of metal powders used in 3D printers are as fine as approximately 20 to 50 μm, which are very small, for example.

One of measures for mass-producing such metal particles that are finer than those demanded in conventional techniques in a short time is a method in which the diameters of liquid nozzles are enlarged, but there is a concern that the yield of metal powders with desired particle sizes might lower. It is conceivable to attempt to make the particle sizes of metal particles fine and uniform by increasing the pressure of a gas jetted from a jet nozzle for enhancement of the yield, but metal particles that are accelerated by increased gas pressure more easily deformed through collision with the wall surface of a spray chamber before being solidified, and there is a concern that an increase in the yield cannot be anticipated. It is also conceivable to make the diameter of a spray chamber gigantic in order to avoid collision between metal particles and the spray chamber, but problems occur such as that replacement of spray chambers increases costs or that a sufficient space cannot be allocated for installation.

An object of the present invention is to provide a metal-powder producing apparatus that can efficiently produce fine metal powders without modifying the body shape of a spray chamber, and a gas jet device and crucible container thereof.

Means for Solving the Problem

The present application includes a plurality of means for solving the problems explained above, and in one example thereof a spray chamber; and a plurality of spray nozzles that liquid-spray a melted metal into the spray chamber are included, and each of the plurality of spray nozzles includes: a liquid nozzle that allows the melted metal to flow down into the spray chamber; and a gas-jet nozzle that has a plurality of gas-jet holes arranged around the liquid nozzle and causing a gas fluid to collide with the melted metal having flowed down from the liquid nozzle.

Advantages of the Invention

According to the present invention, it is possible to produce fine metal powders efficiently without modifying the body shape of a spray chamber.

BRIEF DESCRIPTION OF THE DRAWINGS

FIG. 16 is a figure in which the tendencies of particle size of metal powders obtained from six examples in which any of six Spray Conditions (1) to (6) is modified are summarized in a tabular format in comparison to the particle size of metal powders obtained through reference spray nozzles.

MODES FOR CARRYING OUT THE INVENTION

Figure 1:
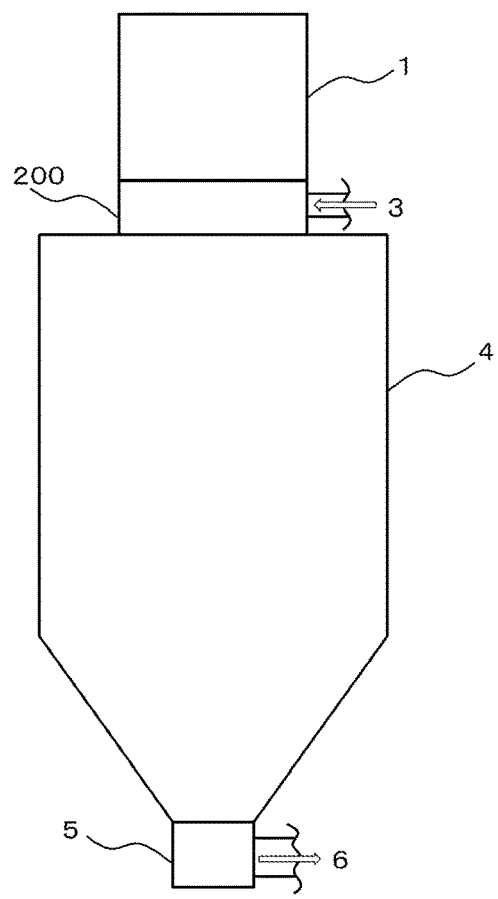
FIG. 1 is an overall-configuration diagram of a gas atomizing apparatus which is a metal-powder producing apparatus.

Hereinafter, embodiments of the present invention are explained by using the drawings FIG. 1 is an overall-configuration diagram of a gas atomizing apparatus which is a metal-powder producing apparatus according to the present invention. The gas atomizing apparatus in FIG. 1 includes: a melting chamber (also referred to as a tundish or a crucible portion) 1 which is a container in which a melted metal (liquid), which is a liquid metal, is accumulated; a metal spray apparatus 200 that liquid-sprays the melted metal through pulverizing the melted metal into a large number of fine particles by blowing a high-pressure gas (gas fluid) to the liquid that flows down from the melting chamber 1 through a liquid nozzle (mentioned below) 11A, 11B in form of fine particles; a jet-gas supply pipe (jet-fluid supply pipe) 3 for supplying the high-pressure gas to the metal spray apparatus 200; a spray chamber 4 that is a container in which an inert-gas atmosphere is maintained and the fine particle liquid metal sprayed from the metal spray apparatus 200 are rapidly cooled and solidified as it falls therein; and a hopper 5 that is provided at a bottom portion of the spray chamber 4 and collects the powder solid metal solidified as the fine particle liquid metal falls in the spray chamber 4.

An inert-gas atmosphere is preferably maintained in the inner space of the melting chamber 1. The spray chamber 4 is a cylindrical container having the same diameter at its upper portion and middle portion, but at its lower portion, the spray chamber 4 has a taper shape in which the diameter thereof decreases as it close to the hopper 5, for ease of collection of metal powders by the hopper 5. An inert gas is discharged as exhaust air 6 as appropriate from the hopper 5.

First Embodiment

Figure 2:
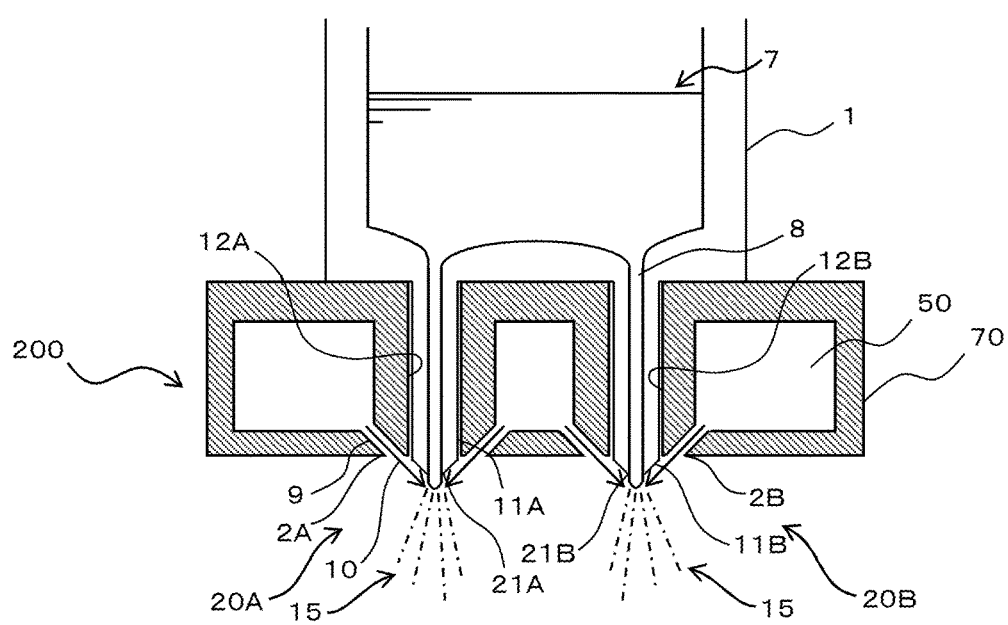
FIG. 2 is a cross-sectional view around a metal spray apparatus 200 of the gas atomizing apparatus according to a first embodiment.
Figure 3:
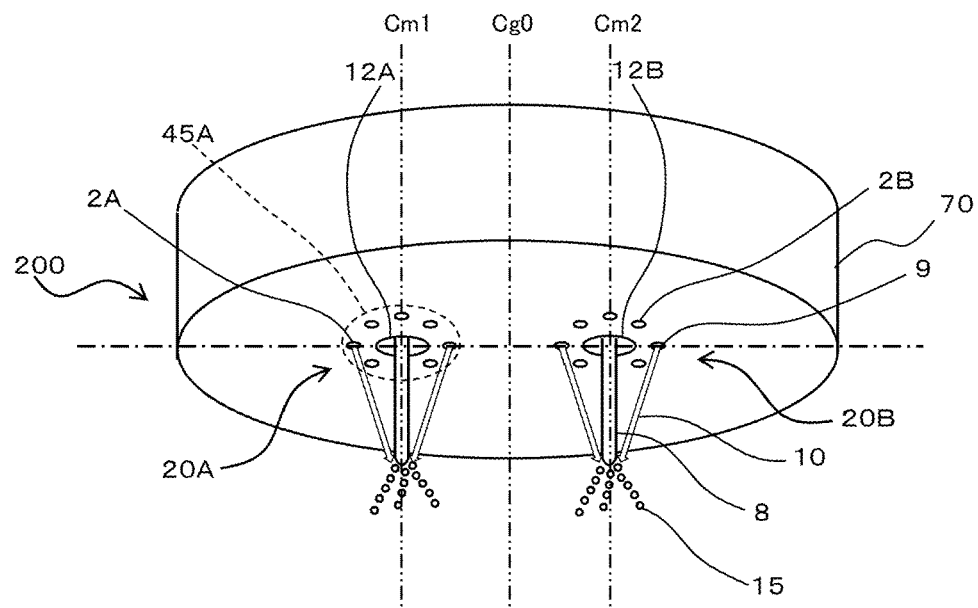
FIG. 3 is a perspective view of the metal spray apparatus 200 of the first embodiment.

FIG. 2 is a cross-sectional view around the metal spray apparatus 200 of the gas atomizing apparatus according to a first embodiment, and FIG. 3 is a perspective view of the metal spray apparatus 200 of the first embodiment. Note that an illustration of first and second liquid nozzles 11A and 11B mentioned below is omitted in FIG. 3.

—Spray Nozzles 20A and 20B—

The metal spray apparatus 200 includes a plurality of liquid nozzles 11A and 11B that allow a melted metal to flow down into the spray chamber 4; and a gas jet device 70 that is installed below the melting chamber (crucible portion) 1 and jets a gas through a plurality of gas-jet nozzles 2A and 2B. The metal spray apparatus 200 is configured with a plurality of spray nozzles 20A and 20B that are provided at the bottom surface of the gas jet device 70 which faces the inner space of the spray chamber 4, and liquid-spray a melted metal into the spray chamber 4. The gas atomizing apparatus in the present embodiment includes two spray nozzles including the first spray nozzle 20A and second spray nozzle 20B. The first and second spray nozzles 20A and 20B have the liquid nozzles 11A and 11B that allow a melted metal to flow down into the spray chamber 4, and a plurality of gas-jet nozzles 2A and 2B arranged around the liquid nozzles 11A and 11B, respectively. That is, each spray nozzle 20 has a pair of a liquid nozzle 11 and a gas-jet nozzle 2.

—Liquid Nozzles 11A and 11B—

As illustrated in FIG. 2, the first liquid nozzle 11A and second liquid nozzle 11B, each of which allows the melted metal in the melting chamber 1 to flow down into the spray chamber 4, are provided at a bottom portion of the melting chamber (crucible portion) 1 so as to protrude vertically downward from the bottom surface of the melting chamber 1. The first liquid nozzle 11A and second liquid nozzle 11B have the same shape, and have therein vertically extending longitudinally elongated holes through which the liquid flows down. These longitudinally elongated holes constitute liquid flow paths through which the melted metal flows down vertically downward from the bottom portion of the melting chamber (crucible portion) 1.

The gas jet device 70 having an approximately columnar outline as illustrated in FIG. 3 is provided with a first liquid-nozzle insertion hole 12A and a second liquid-nozzle insertion hole 12B which are two columnar through-holes having axes (Cm1 and Cm2) that are parallel to the axis (Cg0) of the columnar outline of the gas jet device 70. The first liquid nozzle 11A and second liquid nozzle 11B are inserted into the first liquid-nozzle insertion hole 12A and second liquid-nozzle insertion hole 12B, respectively. The melting chamber 1 is supported by the gas jet device 70. Note that although an illustration thereof is omitted, a heat-insulating material is preferably inserted between the melting chamber 1 and the gas jet device 70 for prevention of thermal conduction from the melting chamber 1.

As illustrated in FIG. 3, the centers of the first liquid-nozzle insertion hole 12A and second liquid-nozzle insertion hole 12B can be arranged on the same straight line along which the center of the cylindrical gas jet device 70 is arranged also, and the first liquid-nozzle insertion hole 12A and second liquid-nozzle insertion hole 12B can be arranged such that the distances from the central axis Cg0 of the gas jet device 70 to the central axes Cm1 and Cm2 of the first liquid-nozzle insertion hole 12A and second liquid-nozzle insertion hole 12B are the same. In addition, the central axes Cm1 and Cm2 of the first liquid-nozzle insertion hole 12A and second liquid-nozzle insertion hole 12B can be caused to coincide with the central axes of the holes of the first liquid nozzle 11A and second liquid nozzle 11B Open ends 21A and 21B positioned at the lower ends of the first liquid nozzle 11A and second liquid nozzle 11B are each arranged to protrude from the bottom surface of the gas jet device 70, and to face the cavity in the spray chamber 4. The melted metal in the melting chamber 1 becomes a liquid flow 8 which flows down through the holes inside the first and second liquid nozzles 11A and 11B, and is released (flows down) into the spray chamber 4 via the open ends 21A and 21B. As the minimum inner diameter of the first liquid nozzle 11A and second liquid nozzle 11B that affects the size of the diameter of the liquid to be introduced into the spray chamber 4 (the size of the diameter of a flow-down area 27 mentioned below), for example, 1 to 2 mm, which is size smaller than those in conventional techniques, can be selected.

—Gas-Jet Nozzles 2A and 2B—

The gas jet device 70 has a columnar outline with a hollow structure which is filled with an inert high-pressure gas, and the inner space thereof is a gas flow path 50 that forms a gas flow around each of the plurality of liquid-nozzle insertion holes 12A and 12B. The gas flow path 50 is supplied with a high-pressure gas from the jet-gas supply pipe 3 connected to a gas suction hole (not illustrated) provided in the side surface the column of the gas jet device 70. The gas jet device 70 jets the high-pressure gas supplied to the gas flow path 50 as a directional jet-gas jet (gas jet flow) 10 via a plurality of jet holes 9 provided in the bottom surface of the gas jet device 70. The plurality of jet holes 9 are arranged to form circles around the spray-chamber side open end of the first liquid-nozzle insertion hole 12A and around the spray-chamber side open end of the second liquid-nozzle insertion hole 12B, and the plurality of jet holes 9 that surround the spray-chamber side open end of the first liquid-nozzle insertion hole 12A constitute the first gas-jet nozzle (first gas-jet portion) 2A, and the plurality of jet holes 9 that surround the spray-chamber side open end of the second liquid-nozzle insertion hole 12B constitute the second gas-jet nozzle (second gas-jet portion) 2B. The gas-jet nozzles 2A and 2B are each provided for one of the plurality of liquid-nozzle insertion holes 12A and 12B, and jet gas flowing in the gas flow path 50 toward the outer side of the gas jet device 70 relative to the open ends of the liquid-nozzle insertion holes 12A and 12B.

Figure 4:
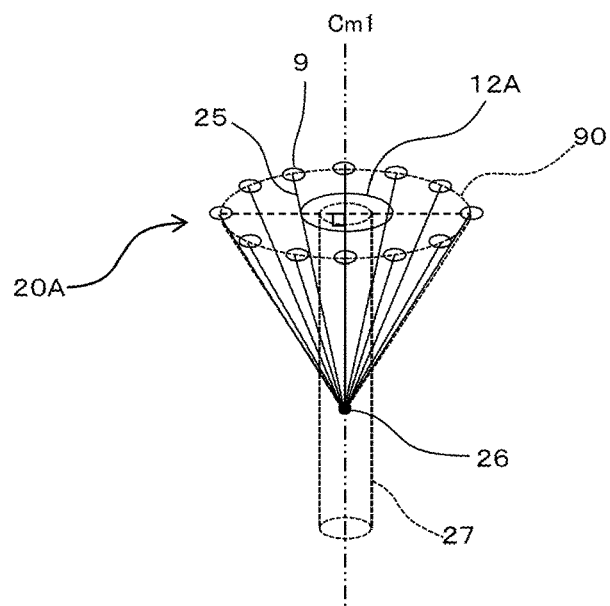
FIG. 4 is a diagram illustrating the relationship between gas-jet directions of a plurality of jet holes 9 constituting a first gas-jet nozzle 2A, and a liquid flow-down area 27 of a first liquid nozzle 11A.

FIG. 4 is a diagram illustrating the relationship between gas-jet directions of the plurality of jet holes 9 constituting each first gas-jet nozzle (first gas-jet portion) 2A and the liquid flow-down area 27 of the first liquid nozzle 11A.

In FIG. 4, the gas-jet directions of the plurality of jet holes 9 constituting the plurality of first gas-jet nozzles (first gas-jet portion) 2A are illustrated with straight lines 25, and each jet hole 9 is formed by boring a through-hole having a central axis coinciding with a corresponding straight line 25 on the bottom surface of the gas jet device 70. The plurality of jet holes 9 are arranged on the bottom surface of the gas jet device 70 at constant intervals concentrically with the central axis Cm1 of the first liquid-nozzle insertion hole 12A. In FIG. 4, the circle formed by the plurality of jet holes 9 is indicated as a circle 90. The gas-jet directions (straight lines 25) of all the jet holes 9 constituting the plurality of first gas-jet nozzles 2A pass a single focus (first focus) 26. That is, the gas-jet directions of all the jet holes 9 converge at one point (focus 26). The focus 26 is positioned in the approximately columnar flow-down area 27 defined by the outline of the melted metal that flows down from the first nozzle 11A (not illustrated in FIG. 4). The diameter of the flow-down area 27 is smaller than the diameter of the first liquid-nozzle insertion hole 12A, and can be adjusted as appropriate according to the minimum inner diameter of the holes constituting the first liquid nozzle 11A. The diameter of the flow-down area 27 can also be set to a value equal to or smaller than the diameter of the open end 21A of the first liquid nozzle 11A, for example.

Note that although explanation thereof is omitted, the plurality of jet holes 9 constituting the plurality of second gas-jet nozzles 2B are also formed in a similar manner to the plurality of jet holes 9 constituting the plurality of first gas-jet nozzles 2A. A focus 26 related to the plurality of jet holes 9 constituting the plurality of second gas-jet nozzles 2B is referred to as a second focus in some cases.

—Operation and Effects—

If a high-pressure gas is supplied from the jet-gas supply pipe 3 in the metal-powder producing apparatus configured in the manner explained above, a high-pressure gas at the same pressure is jetted according to jet directions (straight lines 25), each of which is predetermined for a corresponding jet hole 9, toward the inner space of the spray chamber 4 from all the jet holes 9 constituting the plurality of first gas-jet nozzles 2A and second gas-jet nozzles 2B in the metal spray apparatus 200. At this time, the gas is intensively jetted to each focus (the first focus, and second focus) 26 at the first gas-jet nozzle 2A or second gas-jet nozzle 2B, and fluid films like the one illustrated in FIG. 4 which have inverted-cone shapes (a first inverted-cone shape and a second inverted-cone shape) with their vertexes coinciding with the focus 26 and their bottom surfaces coinciding with the circles 90 along which the plurality of jet holes 9 are arranged are formed.

On the other hand, if the melting chamber 1 is charged with a melted metal, two liquid flows 8 flow down into flow-down areas 27 inside the spray chamber 4 via the first liquid nozzle 11A and second liquid nozzle 11B that are provided at the bottom surface of the melting chamber 1. Then, the liquid flows 8 collide with the inverted-cone shaped (first inverted-cone shaped and second inverted-cone shaped) fluid films formed by high-pressure gases near the two focuses 26 related to the first gas-jet nozzle 2A and second gas-jet nozzle 2B to be pulverized into a large number of fine particles 15. The metals that have become liquid fine particles (fine particles 15) due to the jet gas from the first and second gas-jet nozzles 2A and 2B are rapidly cooled and solidified as they fall in the spray chamber 4 to be collected as a large number of metal powders by the hopper 5.

Since a value (e.g., 1 to 2 mm) which is smaller than those in conventional techniques (e.g., approximately 5 mm) is selected as the minimum inner diameter of the holes constituting the first liquid nozzle 11A and second liquid nozzle 11B in the present embodiment, metal particles with diameters finer than those in the conventional techniques can be obtained easily even if gases are jetted from the gas-jet nozzles 2A and 2B at pressure which is the same as that in the conventional techniques, for example. In addition, since if gases are jetted at the same pressure as that in the conventional techniques, the flying distances of metal particles in the spray chamber 4 can be kept short also, neither replacement with a spray chamber 4 having a larger diameter nor enlargement of the installation space for the spray chamber 4 are necessary for prevention of deformation of the metal particles. On the other hand, although the flow rate of a liquid flow 8 per unit time lowers and the yield lowers per liquid nozzle 11A or 11B, since the minimum inner diameter is reduced as compared with those in the conventional techniques, the yield per unit time can be doubled since the two liquid nozzles 11A and 11B (that is, the two spray nozzles 20A and 20B) are provided for the one spray chamber 4 in the present embodiment.

In addition, since, in the present embodiment, the two focuses 26 are each set at the center of a liquid flow-down area 27, and the jet holes 9 are arranged evenly concentrically with the central axes Cm1 and Cm2 of the first and second liquid-nozzle insertion holes 12A and 12B, a high-pressure gas from the jet holes 9 is jetted to a liquid flow 8 evenly from every direction. Thereby, it is possible to attempt to make the particle sizes of the fine particles 15 uniform.

That is, according to the present embodiment, it is possible to produce fine metal powders efficiently without modifying the body shape of the spray chamber 4.

In addition, the two spray nozzles 20A and 20B in the present embodiment each have one pair of a liquid nozzle 11, and a gas-jet nozzle 2. In this manner, if spray nozzles 20 are each constituted by one set of a liquid nozzle 11, and a jet nozzle 2, it becomes possible to finely control the particle sizes of a liquid metal sprayed from the individual spray nozzles 20 as compared to spray nozzles in which a plurality of liquid nozzles 11 are provided, and a plurality of jet holes 9 are arranged to surround all the liquid nozzles 11, for example. For example, it is also possible to attain a desired distribution that ranges from fine particles to coarse particles as a metal powder particle size distribution by modifying spray conditions of each nozzle as in a fifth embodiment mentioned below.

Furthermore, the gas jet device 70 according to the present embodiment has the plurality of liquid-nozzle insertion holes 12A and 12B, and the gas flow path 50 that forms a gas flow around each of the plurality of liquid-nozzle insertion holes 12A and 12B. The gas flows in the gas flow path 50, before jet from the jet holes 9, have a function of cooling the liquid nozzles 11A and 11B by heat exchange while a liquid flows down therethrough. The gas jet device 70 in the present embodiment has a structure in which the gas flow path 50 is formed around each of the plurality of liquid nozzles 11A and 11B, and the liquid nozzles 11A and 11B are each cooled from therearound due to heat exchange with a gas flow in the flow path 50. Thereby, a local temperature increase, that is, creation of a non-uniform temperature distribution, in the liquid nozzles 11A and 11B can be prevented, and the possibility that the liquid nozzles 11A and 11B are damaged because of the non-uniform temperature distribution can be lowered. In particular, since the gas jet device 70 in the present embodiment is provided with the liquid-nozzle insertion holes 12A and 12B, jet holes 9, and gas flow path 50 that are symmetric about the central axis Cg0 of the gas jet device 70, there is an advantage that the temperature distribution of the gas jet device 70 and liquid nozzles 11A and 11B on a plane orthogonal to the central axis Cg0 can be made uniform.

Note that the crucible portion (melting chamber) 1 in which a melted metal is accumulated, and the liquid nozzles 11A and 11B that extend downward from a bottom portion of the crucible portion 1 and form liquid flow paths through which the melted metal flows down downward from the bottom portion of the crucible portion 1 that are explained in the embodiment explained above are collectively referred to as a "crucible container" in some cases.

Second Embodiment

Since, in the first embodiment explained above, the two spray nozzles 20A and 20B are provided for the spray chamber 4 with the same diameter as those in the conventional techniques, there is a fear that fine particles 15 sprayed from each spray nozzle 20A or 20B may collide and be deformed before being solidified in the spray chamber 4. The present embodiment is one of embodiments to attempt to solve the problem.

Figure 5:
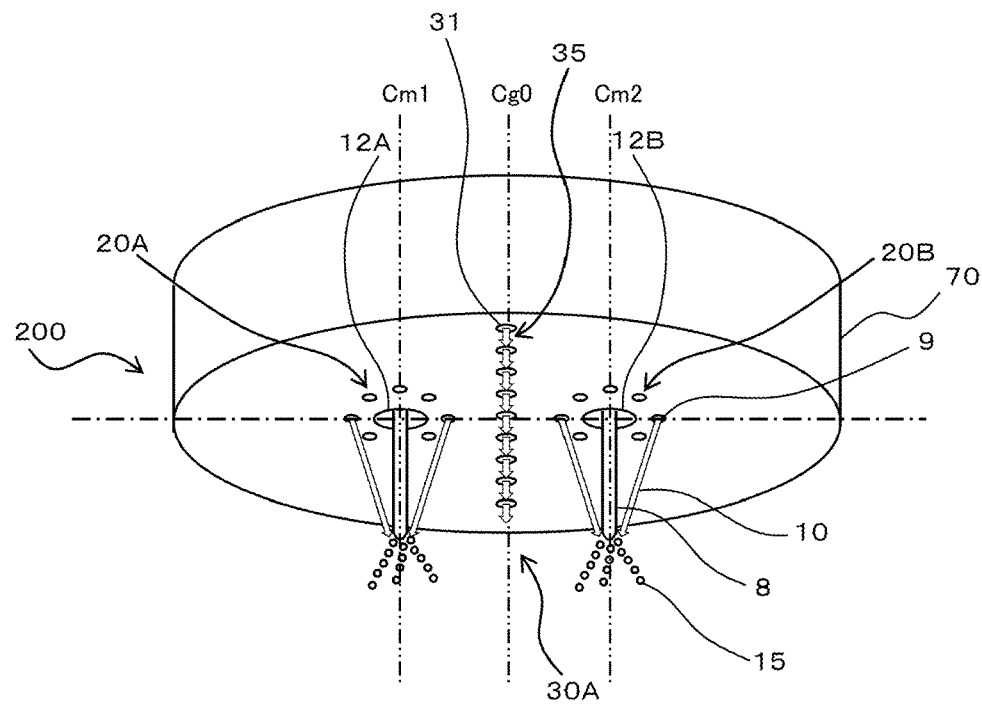
FIG. 5 is a perspective view of the metal spray apparatus 200 of a second embodiment.

FIG. 5 is a perspective view of the metal spray apparatus 200 of a second embodiment. Note that similar to FIG. 3, an illustration of the first and second liquid nozzles 11A and 11B is omitted. The configuration is the same as the first embodiment in other respects, and explanation thereof is omitted.

The bottom surface of the gas jet device 70 in FIG. 5 is provided with a seal-gas jet flow nozzle 30A formed with a plurality of jet holes 31 arranged linearly at predetermined intervals between the two adjacent spray nozzles 20A and 20B (in other words, two liquid-nozzle insertion holes 12A and 12B). The straight line along which the plurality of jet holes 31 are arranged crosses the central axis Cg0 of the gas jet device 70, and passes through the center of the bottom surface of the gas jet device 70. Each jet hole 31 is formed by boring a through-hole having a central axis extending approximately vertically on the bottom surface of the gas jet device 70. Each jet hole 31 is, similar to the jet holes 9, configured such that a high-pressure gas can be supplied thereto from the jet-gas supply pipe 3, and the high-pressure gas is jetted in the vertically downward direction which coincides with the axial direction of each jet hole 31. Thereby, a film-like jet flow (an air curtain, and a seal gas jet flow) 35 that partitions at least an upper area (space) of the spray chamber 4 into two is formed.

The thus-formed film-like jet flow 35 function as an air curtain, and prevents collision between fine particles 15 sprayed from the first spray nozzle 20A (a melted metal that is allowed to flow down from the liquid nozzle 11A) and fine particles 15 sprayed from the second spray nozzle 20B (a melted metal that is allowed to flow down from the liquid nozzle 11B). As a result, occurrence of deformed metal particles can be prevented, and the metal powder producing efficiency can be enhanced over the first embodiment. In addition, since collision between fine particles 15 can be prevented even if a spray chamber 4 having the same diameter as those in the conventional techniques is used, for example, increase in the cost due to replacement of the spray chamber 4 and increase in the installation space for the spray chamber 4 can also be prevented.

Note that although the plurality of jet holes 31 are preferably arranged to traverse the bottom surface of the gas jet device 70 as illustrated in FIG. 5 for prevention of collision between particles, they may be intensively arranged only at a portion where collision between particles is predicted to occur frequently (e.g., near the central axis Cg0), and arrangement thereof in other portions may be omitted. Although the plurality of jet holes 31 are arranged linearly in the example explained above, they may be arranged curvilinearly. In addition, the inner space of the gas jet device 70 may be partitioned, and it may be made possible to supply of the jet holes 31 with a gas at different pressure or with a different type of gas from those for the jet holes 9.

Third Embodiment

The present embodiment is a modification example of the second embodiment, and collision between fine particles 15 can be prevented by the film-like jet flow 35 also if the metal spray apparatus 200 (gas jet device 70) is configured in the manner explained next.

Figure 6:
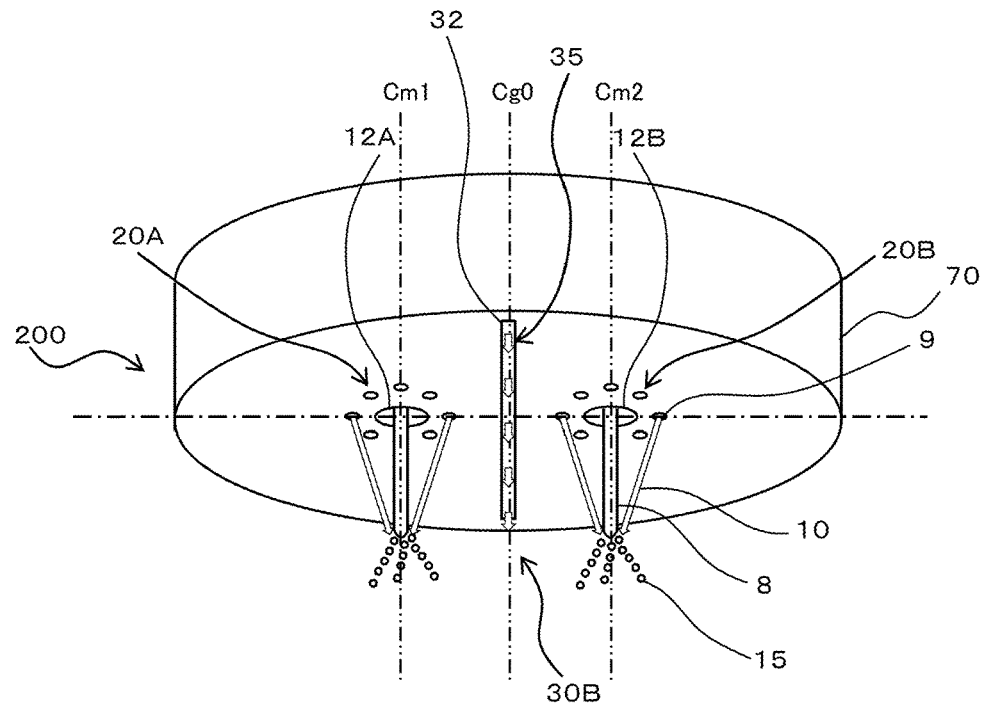
FIG. 6 is a perspective view of the metal spray apparatus 200 of a third embodiment.

FIG. 6 is a perspective view of the metal spray apparatus 200 of a third embodiment. Note that similar to FIG. 3 and the like, an illustration of the first and second liquid nozzles 11A and 11B is omitted. The configuration is the same as the first embodiment in other respects, and explanation thereof is omitted.

The bottom surface of the gas jet device 70 in FIG. 6 is provided with, as a seal-gas jet flow nozzle 30B, a slit 32 which is a thin gap that extends linearly between the two adjacent spray nozzles 20A and 20B. The slit 32 crosses the central axis Cg0 of the gas jet device 70, and passes through the center of the bottom surface of the gas jet device 70. The slit 32 is formed by boring a through-hole on the bottom surface of the gas jet device 70. The slit 32 is, similar to the jet holes 9, configured such that a high-pressure gas can be supplied thereto from the jet-gas supply pipe 3, and the high-pressure gas is jetted from the slit 32 in the vertically downward direction. Thereby, a film-like jet flow (air curtain) 35 that partitions at least an upper area of the spray chamber 4 into two is formed.

Since the thus-formed film-like jet flow 35 prevents collision between fine particles 15 sprayed from the first spray nozzle 20A and fine particles 15 sprayed from the second spray nozzle 20B, occurrence of deformed metal particles can be prevented, and the metal powder producing efficiency can be enhanced over the first embodiment.

Note that although the slit 32 is preferably arranged to traverse the bottom surface of the gas jet device 70 as illustrated in FIG. 6 for prevention of collision between particles, they may be intensively arranged only at a portion where collision between particles is predicted to occur frequently (e.g., near the central axis Cg0), and arrangement thereof in other portions may be omitted. In addition, the inner space of the gas jet device 70 may be partitioned, and it may be made possible to supply the slit 32 with a gas at different pressure or with a different type of gas from those for the jet holes 9.

Fourth Embodiment

The present embodiment is one of embodiments to attempt to solve the problem which is the same as that of the second and third embodiments explained above (collision and deformation of fine particles 15 before being solidified that are sprayed from the two adjacent spray nozzles 20A and 20B), and is equivalent to one in which the plurality of gas-jet nozzles 2A and 2B in the first embodiment are tilted by a predetermined angle θ.

Figure 7:
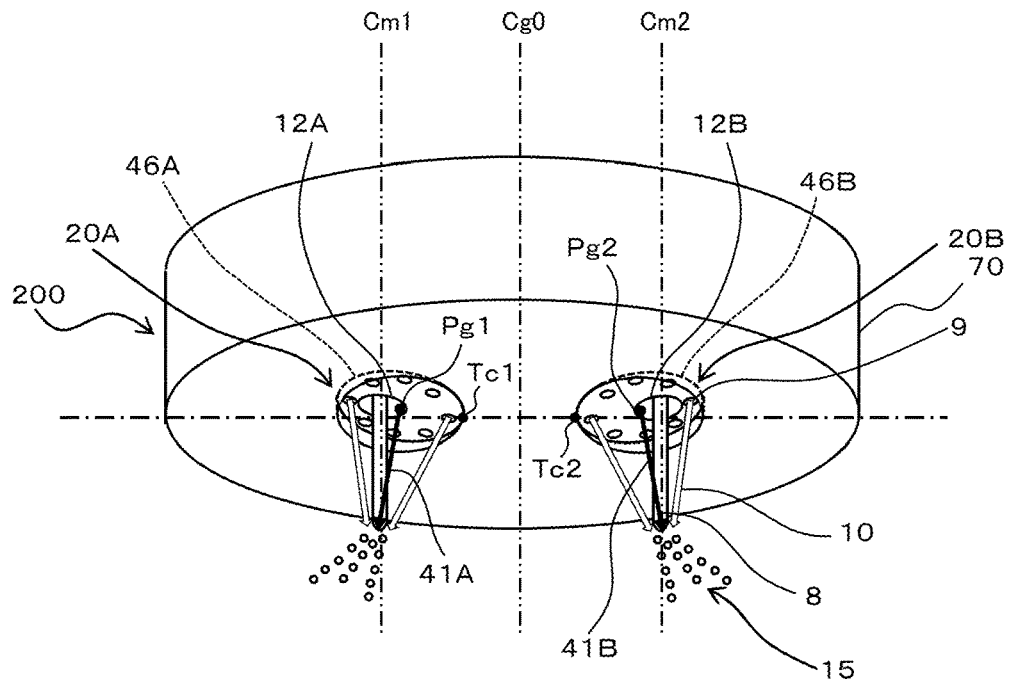
FIG. 7 is a perspective view of the metal spray apparatus 200 of a fourth embodiment.
Figure 8:
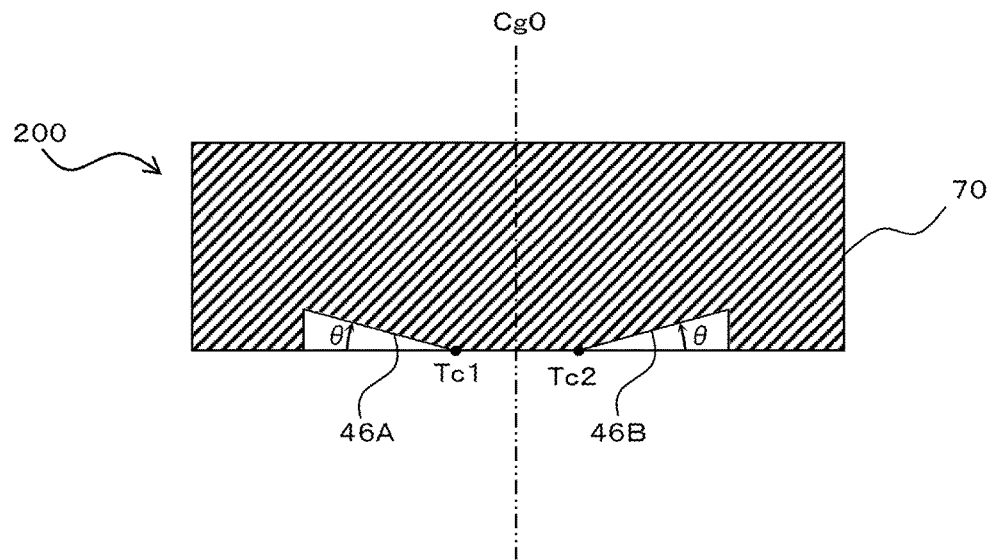
FIG. 8 is a schematic cross-sectional view of the metal spray apparatus 200 taken along a perpendicular plane including a central axis Cg0 of the metal spray apparatus 200, and two points Tc1 and Tc2 mentioned below.

FIG. 7 is a perspective view of the metal spray apparatus 200 of the fourth embodiment, FIG. 8 is a schematic cross-sectional view of the gas jet device 70 taken along a perpendicular plane including the central axis Cg0 of the gas jet device 70 and two points Tc1 and Tc2 mentioned below. Note that an illustration of the first and second liquid nozzles 11A and 11B is omitted in FIG. 7, and only a cross-sectional shape of the outline of the gas jet device 70 is illustrated in FIG. 8. Explanation of portions which are the same as corresponding portions in the preceding embodiments is omitted as appropriate.

First, a first circular surface 45A (see FIG. 3) is set. The first circular surface 45A is concentric with the circle 90 along which all the jet holes 9 constituting the plurality of first gas-jet nozzles (first gas-jet portions) 2A in the first embodiment are arranged. The diameter of the first circular surface 45A is set such that all the jet holes 9 constituting the plurality of first gas-jet nozzles 2A are located within the first circular surface 45A. At this time, a first circular surface 46A of the plurality of first gas-jet nozzles 2A according to the fourth embodiment illustrated in FIG. 7 is equivalent to one that is obtained by tilting the first circular surface 45A by the predetermined angle θ upward about a point (tilt center) Tc1 that is set to a point on the circumference of the first circular surface 45A which point is closest to the central axis Cg0 as illustrated in FIG. 8. If a second circular surface 45B (not illustrated) is also set for the plurality of second gas-jet nozzles (second gas-jet portion) 2B in a similar manner, a second circular surface 46B of the plurality of second gas-jet nozzles 2B in FIG. 7 is equivalent to one that is obtained by tilting the second circular surface 45B by the predetermined angle θ upward about a point (tilt center) Tc2 that is set to a point on the circumference of the second circular surface 45B which point is closest to the central axis Cg0.

In addition, in FIG. 7, the plurality of jet holes 9 constituting the plurality of first gas-jet nozzles (first gas-jet portion) 2A and the plurality of second gas-jet nozzles (second gas-jet portion) 2B are arranged at constant intervals on the circumferences of the circles 90 with the same diameter centered on two points Pg1 and Pg2 which are located on the first circular surface 46A and second circular surface 46B, respectively, and are equidistant from the central axis Cg0. The two points Pg1 and Pg2 are the center points of the bottom surfaces of the first and second inverted-cone shapes related to fluid films formed by jet gases of the plurality of first and second gas-jet nozzles 2A and 2B.

Unlike the first embodiment, the center point Pg1 of the bottom surface of the inverted cone is positioned away from the central axis Cm1 of the first liquid-nozzle insertion hole 12A, and inside the circle 90 constituted by the plurality of jet holes 9. Similarly, the center point Pg2 is also positioned away from the central axis Cm2 of the second liquid-nozzle insertion hole 12B, and inside the circle 90 constituted by the plurality of jet holes 9. More specifically, the central axis Cm1 is positioned on the radially outer side of the bottom surface of the gas jet device 70 (that is, the inner-surface side of the spray chamber 4) relative to the center point Pg1 to an extent that the open end of the first liquid-nozzle insertion hole 12A does not overlap the open ends of the jet holes 9 (i.e., to an extent that the first liquid nozzle 11A does not overlap the plurality of gas-jet nozzles 2A corresponding to the first liquid nozzle 11A). Similarly, the central axis Cm2 is positioned on the radially outer side of the bottom surface of the gas jet device 70 (that is, the inner-surface side of the spray chamber 4) relative to the center point Pg2 to an extent that the open end of the second liquid-nozzle insertion hole 12B does not overlap the open ends of the jet holes 9 (i.e., to an extent that the second liquid nozzle 11B does not overlap the plurality of gas-jet nozzles 2B corresponding to the second liquid nozzle 11B).

A straight line 41A, and a straight line 41B are defined, the straight line 41A linking the center point Pg1 of the bottom surface (that is, the circle 90) of the first inverted-cone shape related to a fluid film formed by a jet gas of the plurality of first gas-jet nozzles 2A and the vertex (first focus 26) of the first inverted-cone shape, the straight line 41B similarly linking the center point Pg2 of the bottom surface (that is, the circle 90 (n.b., not illustrated)) of the second inverted-cone shape related to a fluid film formed by a jet gas of the plurality of second gas-jet nozzles 2B and the vertex (second focus 26) of the second inverted-cone shape. Then, the directions along the two straight lines 41A and 41B from the center points Pg1 and Pg2 toward the first and second focuses 26 are defined as focus directions, and the directions are indicated by arrows in FIG. 7.

Figure 9:
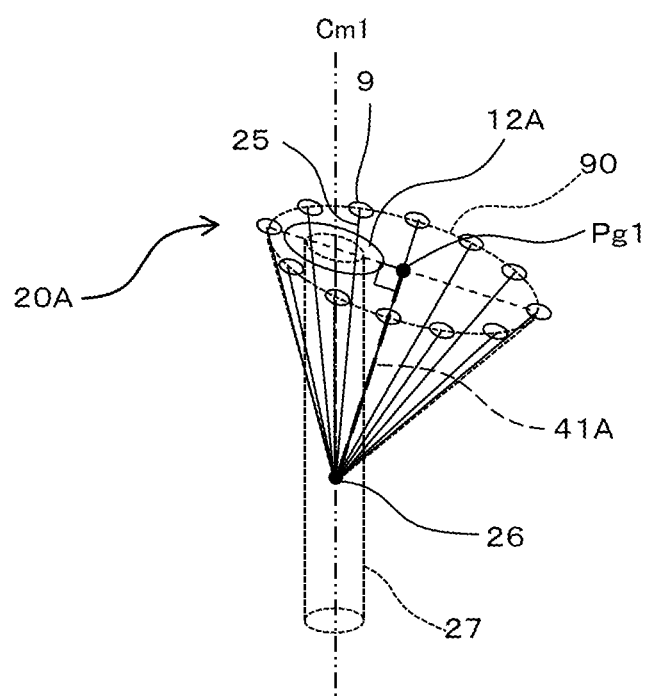
FIG. 9 is a diagram illustrating the relationship between the gas-jet directions of the plurality of jet holes 9 constituting the first gas-jet nozzle 2A in FIG. 7, and the liquid flow-down area 27 of the first liquid nozzle 11A.

In the present embodiment, gas-jet directions 25 of the plurality of holes 9 (that is, the axial directions of the jet holes (through-holes) 9) of each the plurality of first gas-jet nozzles 2A and the plurality of second gas-jet nozzles 2B are adjusted as illustrated in FIG. 9 such that the straight line 41A and straight line 41B form an inverted V-shape as illustrated in FIG. 7. It should be noted however that the gas-jet directions 25 of the plurality of holes 9 constituting the plurality of first gas-jet nozzles 2A and plurality of second gas-jet nozzles 2B are each adjusted preferably such that the straight line 41A and straight line 41B are arranged on the same plane that passes through the central axis Cg0.

FIG. 9 is a diagram illustrating the relationship between gas-jet directions of the plurality of jet holes 9 constituting the plurality of first gas-jet nozzles 2A in FIG. 7, and the liquid flow-down area 27 of the first liquid nozzle 11A. Note that an illustration of the first liquid nozzles 11A is omitted in FIG. 9.

The plurality of jet holes 9 constituting the plurality of first gas-jet nozzles (first gas-jet portion) 2A in the figure are each formed by boring a through-hole having a central axis coinciding with the straight line 25 illustrated in the figure on the bottom surface of the gas jet device 70. That is, in the present embodiment, the central axes of all the jet holes 9 related to the plurality of first gas-jet nozzles 2A are also tilted by θ as compared with the state illustrated in FIG. 4 (the state of the first embodiment), and the direction of the focus 26 is inclined toward the inner-side surface of the spray chamber 4 by θ.

In addition, in FIG. 9, the first focus 26 is positioned in the approximately columnar flow-down area 27 defined by the outline of the melted metal that flows down from the first liquid nozzle 11A (not illustrated in FIG. 9). Then, the first focus 26 is positioned on the radially outer side of the bottom surface of the gas jet device 70 relative to the center point Pg1 of the bottom surface of the inverted cone. Note that although explanation thereof is omitted, the center point Pg1 of the bottom surface of the inverted cone related to the plurality of second gas-jet nozzles 2B and the second focus 26, which is the vertex of the inverted cone, are also arranged to have a similar positional relationship to the relationship between the center point Pg1 and first focus 26 of the first gas-jet nozzle 2A.

—Operation and Effects—

If a high-pressure gas is supplied from the jet-gas supply pipe 3 in the metal-powder producing apparatus configured in the manner explained above, the high-pressure gas at the same pressure is jetted according to predetermined jet directions (straight lines 25) from all the jet holes 9 constituting the plurality of first gas-jet nozzles 2A and second gas-jet nozzles 2B. At this time, the gas is intensively jetted to each focus (the first focus and second focus) 26 at the first gas-jet nozzle 2A and second gas-jet nozzle 2B, and fluid films like the one illustrated in FIG. 9 which have inverted-cone shapes (a first inverted-cone shape and a second inverted-cone shape) with their vertexes coinciding with the focus 26 and their bottom surfaces coinciding with the circles along which the plurality of jet holes 9 are arranged are formed. Although the inverted cones at this time are tilted by the predetermined angle θ, similar to the first embodiment, they are right circular cones with the straight lines 41A and 41B linking the centers Pg1 and Pg2 of the cone bottom surfaces and the vertexes being orthogonal to the cone bottom surfaces, respectively.

On the other hand, the liquid flows 8 that flow down via the first liquid nozzle 11A and second liquid nozzle 11B collide with the tilted inverted-cone shaped (right circular-cone shaped) fluid films formed by high-pressure gases near the two focuses 26 related to the plurality of first gas-jet nozzles 2A and second gas-jet nozzles 2B to be pulverized into a large number of fine particles 15. As this happens, the fine particles 15 are given speeds toward the radially outer side of the spray chamber 4 (the inner-surface side of the spray chamber 4) by the plurality of tilted first gas-jet nozzles 2A and the plurality of tilted second gas-jet nozzles 2B, and scattered toward the inner-side surface of the spray chamber 4 as illustrated in FIG. 7. That is, since the fine particles 15 sprayed from the first spray nozzle 20A and the fine particles 15 sprayed from the second spray nozzle 20B are scattered toward the different directions, collision and resulting deformation of the fine particles 15 as they fall in the spray chamber 4 can be prevented. Accordingly, according to the present embodiment, the metal powder producing efficiency can be enhanced over the first embodiment.

Note that although there is a possibility that the yield of metal powders with desired particle sizes lowers as compared with the yield of metal powders explained in the fourth embodiment, even if the gas-jet directions (the directions of the central axes) of the plurality of jet holes 9 in the configuration of the first embodiment are modified as appropriate to change the form of the fluid films formed by gases jetted from the plurality of gas-jet nozzles 2A and 2B from right circular cones into oblique circular cones, speeds toward the inner-surface side of the spray chamber 4 can be given to the fine particles 15, and so collision between fine particles 15 can be prevented.

Note that for avoidance of collision between fine particles 15, the horizontal scatter directions of fine particles 15 sprayed from the first spray nozzle 20A and fine particles 15 sprayed from the second spray nozzle 20B are preferably opposite to each other, and in order to achieve this, the plurality of first gas-jet nozzles 2A and plurality of second gas-jet nozzles 2B are preferably provided such that the central axis Cg0 and the two center points Pg1 and Pg2 are positioned on the same plane.

In addition, although the tilt angles of the gas-jet nozzles 2A and 2B related to the two spray nozzles 20A and 20B are explained above as being made equal to each other for simplification of explanation, those tilt angles may be made different from each other.

Fifth Embodiment

The present embodiment is characterized in that it is made possible to control the particle size distribution (also referred to as the particle size distribution) of metal powders produced by a single gas atomizing apparatus (metal-powder producing apparatus) by making spray conditions of the plurality of spray nozzles 20A and 20B different from each other.

Figure 10:
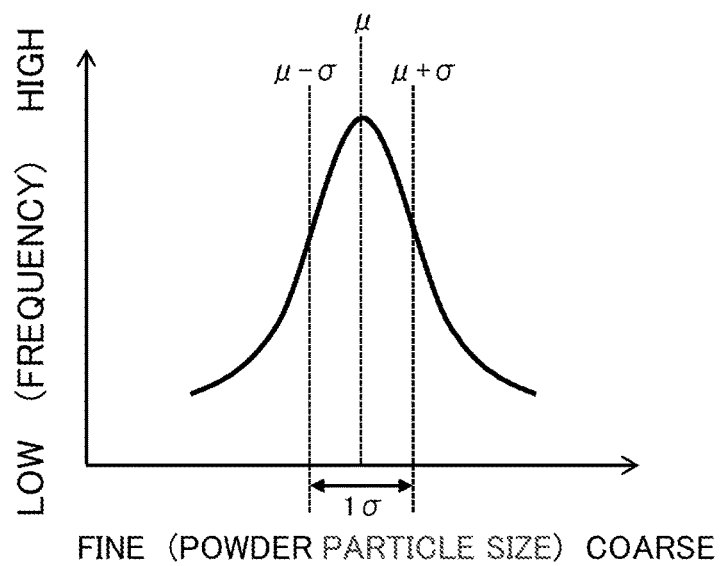
FIG. 10 is a distribution chart of the particle size of metal powders produced by a gas atomizing apparatus in which the same spray conditions are used for individual spray nozzles.

If the same spray conditions are used for the plurality of spray nozzles 20A and 20B as in the first to fourth embodiments explained above, typically, the particle size distribution of produced metal powders becomes a normal distribution as illustrated in FIG. 10 having its peak at the average particle size (average diameter) defined by the spray conditions. That is, if the same spray conditions are used, the particle sizes of produced metal powders tend to be concentrated at one peak value. However, particle sizes that a variety of users wish to have do not always coincide with the peak value necessarily, and there may be users who wish to have powders with particle sizes that are away from the peak value (e.g., particle sizes which are out of the range of μ (average)±σ (standard deviation) (1σ–interval) or powders with particle sizes in a relatively wide range (e.g., an interval wider than the 1σ–interval). Accordingly, in cases where there are such demands, there is a possibility that the yield of metal powders lowers if a gas atomizing apparatus that produces metal powders whose particle size distribution is a normal distribution having one peak (that is, a gas atomizing apparatus in which the same spray conditions are used for individual spray nozzles) is used.

In view of this, spray conditions are made different between the plurality of spray nozzles 20A and 20B in the present embodiment. Specifically, modifiable spray conditions include, for example: (1) the jet pressure of a gas fluid jetted from the plurality of gas-jet nozzles 2; (2) the angles of the jet holes 9 at the plurality of gas-jet nozzles 2; (3) the diameters of the jet holes 9 at the plurality of gas-jet nozzles 2; (4) the number of the jet holes 9 at the plurality of gas-jet nozzles 2; (5) the minimum hole diameter of the liquid nozzle 11 (orifice diameter); and (6) the tip shape of the liquid nozzle 11. Next, a structure for realizing these spray conditions is explained with reference to FIG. 11 to FIG. 15.

Spray Condition (1): The Jet Pressure of a Gas Fluid Jetted from the Plurality of Gas-Jet Nozzles 2

Figure 11:
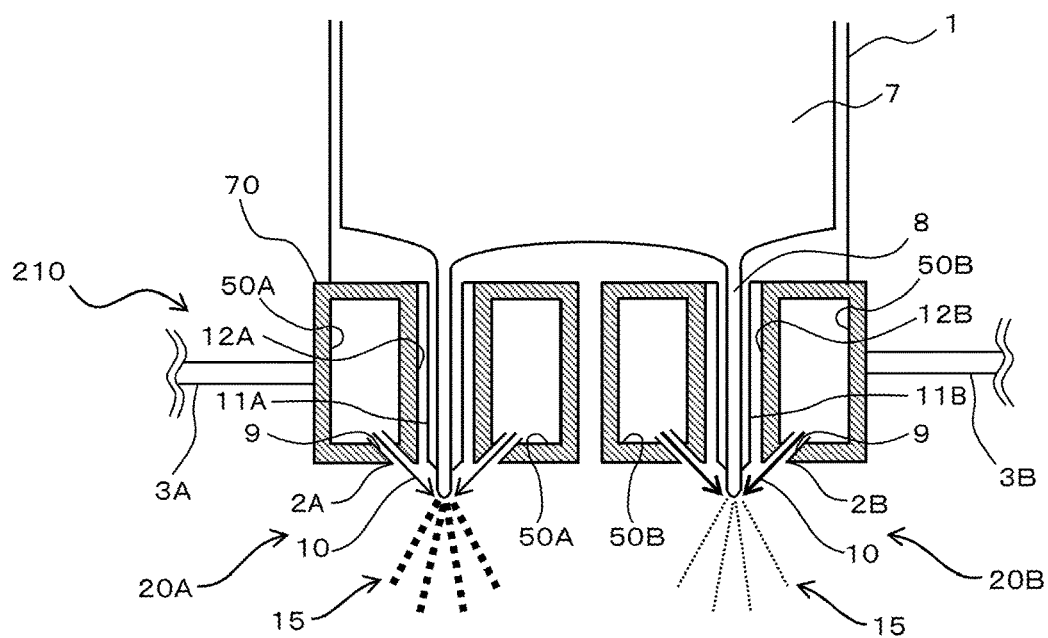
FIG. 11 is a cross-sectional view around one example of a metal spray apparatus of a gas atomizing apparatus according to a fifth embodiment.

FIG. 11 is a cross-sectional view around a metal spray apparatus 210 that can make the jet pressure of a gas fluid (high-pressure gas) jetted from the gas-jet nozzle 2A related to the spray nozzle 20A, and the jet pressure of a gas fluid jetted from the gas-jet nozzle 2B related to the spray nozzle 20B different from each other. The metal spray apparatus 210 in the figure includes independent internal flow paths 50A and 50B that are connected to gas supply sources (not illustrated) with different pressure unlike the first embodiment in which the single gas flow path 50 is used for the two gas-jet nozzles 2A and 2B. Each internal flow path 50A or 50B is supplied with a gas fluid from a gas supply source with different pressure via a separate jet-gas supply pipe 3A or 3B, and gas fluids with different jet pressure are jetted from the gas-jet nozzles 2A and 2B.

Figure 17:
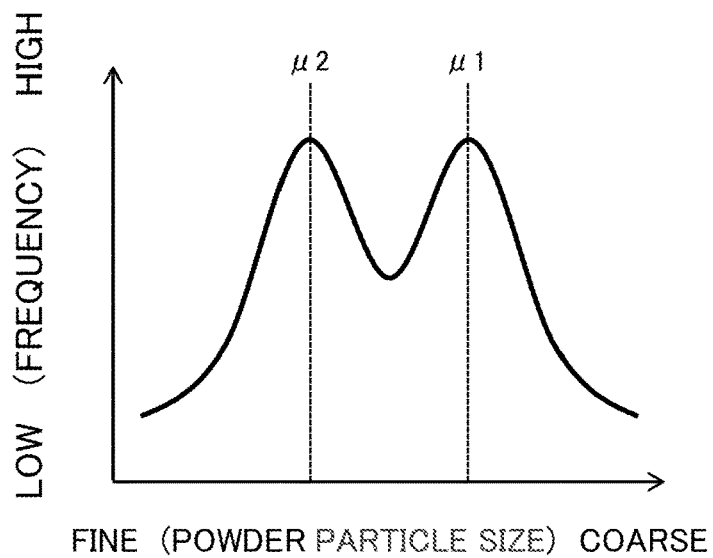
FIG. 17 is a distribution chart of the particle size of metal powders produced by one example of a gas atomizing apparatus in which different spray conditions are used for individual spray nozzles.

For example, if a gas with relatively high pressure is introduced into the internal flow path 50B and a gas fluid with higher pressure than that from the gas-jet nozzle 2A is jetted from the gas-jet nozzle 2B, since a melted metal that flows down from the second liquid nozzle 11B is pulverized into finer pieces due to the high-pressure gas jetted from the gas-jet nozzle 2B than a melted metal that flows down from the first liquid nozzle 11A, the particle size of a metal sprayed from the spray nozzle 20B is more refined as compared with the particle size of a metal sprayed from the spray nozzle 20A. That is, the higher the jet pressure of the gas fluid jetted from the gas-jet nozzle 2 is, the more refined metal powders tend to be. Thereby, the particle size distributions of the metals sprayed from the two spray nozzles 20A and 20B with different gas jet pressure are different from each other, and two peaks (average particle sizes μ1 and μ2) appear in the metal powder particle size distribution as illustrated in FIG. 17, for example. If the average particle size of metal powders sprayed from the spray nozzle 20A is defined as μ1 in FIG. 17, the average particle size of metal powders sprayed from the spray nozzle 20B is μ2 which is smaller than μ1. Thereby, the metal-powder-particle size distribution in this case becomes a distribution obtained by combining two normal distributions with the different average particle sizes μ1 and μ2 that are defined by the spray conditions of the two spray nozzles 20A and 20B. Accordingly, as compared with the case where the spray conditions of the spray nozzles 20A and 20B are the same (see FIG. 10), metal powders with a wide range of particle size can be produced at once.

FIG. 16 is a figure in which the tendencies of particle size of metal powders obtained from six examples in which any of Spray Conditions (1) to (6) explained above is modified are summarized in a tabular format in comparison to a reference spray nozzle (denoted as "Comparative Example" in the figure, and any of the spray nozzles 20A and 20B in the first embodiment, for example).

A first example in FIG. 16 corresponds to the spray nozzle 20B in FIG. 11 obtained by modifying the comparative example (here, the spray nozzle 20A in the first embodiment) in terms of Spray Condition (1) explained above, and the value of the jet-gas pressure of the gas-jet nozzle 2 is made 1.5-fold of the comparative example by using the independent gas flow paths (internal flow paths 50A and 50B). In this case, the particle size of metal powders formed by the spray nozzle in the first example becomes finer as compared to the comparative example.

Spray Condition (2): The Angles of the Jet Holes 9 at the Plurality of Gas-Jet Nozzles 2

Figure 12:
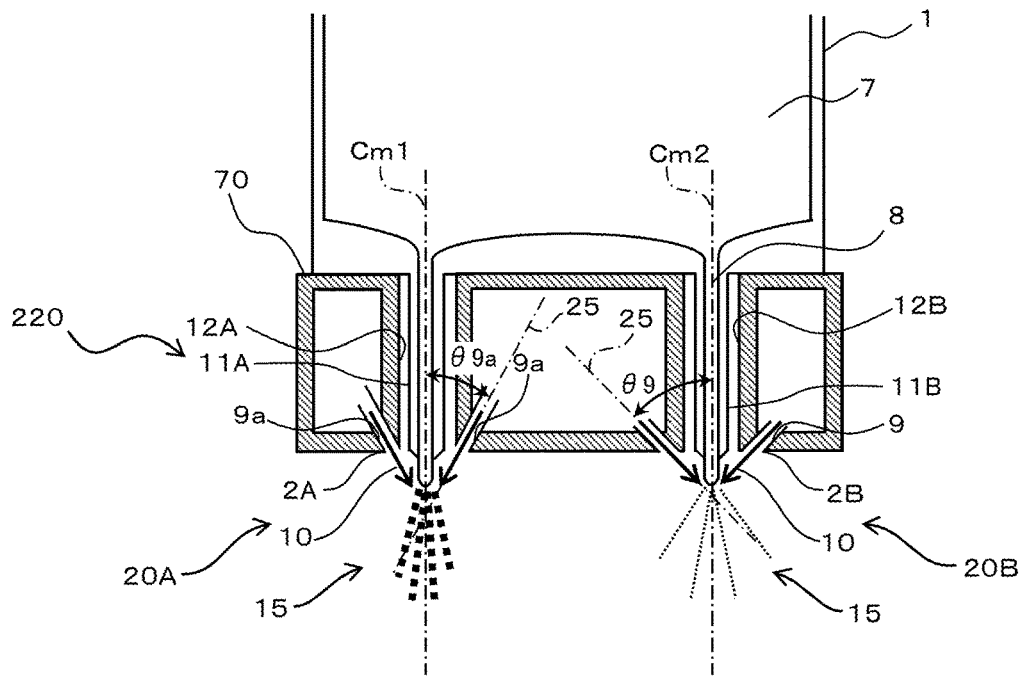
FIG. 12 is a cross-sectional view around one example of the metal spray apparatus of the gas atomizing apparatus according to the fifth embodiment.

FIG. 12 is a cross-sectional view around a metal spray apparatus 220 obtained by making the angle (angle of inclination) of a jet hole 9a of the gas-jet nozzle 2A related to the spray nozzle 20A and the angle of the jet hole 9 of the gas-jet nozzle 2B related to the spray nozzle 20B different from each other. The angle of the jet hole 9 (jet hole 9a) can be defined as the angle 69 (θ9a) formed by the central axis 25 of the jet hole 9 (jet hole 9a) and the central axis Cm2 of the second liquid-nozzle insertion hole 12B (the central axis Cm1 of the first liquid-nozzle insertion hole 12A) as illustrated in the figure (n.b., θ9 and θ9a are smaller than 90 degrees). The metal spray apparatus 220 in the figure has the angle θ9a of the plurality of jet holes 9a belonging to the gas-jet nozzle 2A and the angle θ9 of the plurality of jet holes 9 belonging to the gas-jet nozzle 2B, which angles are made different from each other, unlike the first embodiment in which the common angle of the jet holes 9 is used for the two gas-jet nozzles 2A and 2B. Specifically, the angle θ9a of the plurality of jet holes 9a belonging to the gas-jet nozzle 2A are set smaller than the angle θ9 of the plurality of jet holes 9 belonging to the gas-jet nozzle 2B.

If the angle θ9a of the plurality of jet holes 9a belonging to the gas-jet nozzle 2A (spray nozzle 20A) is made smaller than the angle θ9 of the plurality of jet holes 9 belonging to the gas-jet nozzle 2B (spray nozzle 20B) as illustrated in FIG. 12, the particle size of a metal sprayed from the spray nozzle 20A is more coarsened as compared with the particle size of a metal sprayed from the spray nozzle 20B. That is, the smaller the angle of the jet hole 9 or 9a is, the more coarsened metal powders tend to be (in other words, the larger the angle of the jet hole 9 or 9a is (the smaller the angle of the jet hole 9 or 9a relative to the horizontal plane is), the more refined metal powders tend to be). Thereby, the particle size distributions of the metals sprayed from the two spray nozzles 20A and 20B with different angles of jet holes 9 and 9a become different from each other, and two peaks (average particle sizes µ1 and µ2) appear in the metal powder particle size distribution as illustrated in FIG. 17, for example. If the average particle size of metal powders sprayed from the spray nozzle 20A is defined as µ1 in FIG. 17, the average particle size of metal powders sprayed from the spray nozzle 20B is µ2 which is smaller than µ1. That is, similar to the case explained above in which Spray Condition (1) is modified, as compared with the case where the spray conditions of the spray nozzles 20A and 20B are the same (see FIG. 10), metal powders with a wide range of particle size can be produced at once.

A second example in FIG. 16 corresponds to the spray nozzle 20A in FIG. 12 obtained by modifying the comparative example (here, the spray nozzle 20B in the first embodiment) in terms of Spray Condition (2) explained above, and the angle θ9a of the jet hole 9a is set to a value reduced by 10 degrees from the angle θ9 in the comparative example. In this case, the particle size of metal powders formed by the spray nozzle 20A in the second example becomes coarser as compared to the comparative example.

Spray Condition (3): The Diameters of the Jet Holes 9 at the Plurality of Gas-Jet Nozzles 2

Figure 13:
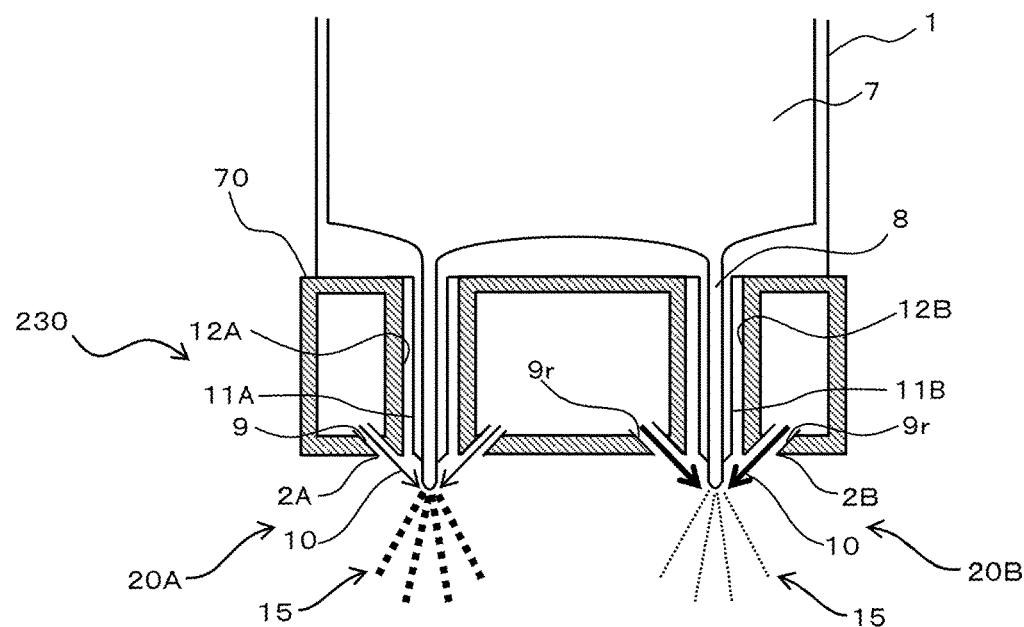
FIG. 13 is a cross-sectional view around one example of the metal spray apparatus of the gas atomizing apparatus according to the fifth embodiment.

FIG. 13 is a cross-sectional view around a metal spray apparatus 230 obtained by making the diameter of the jet hole 9 of the gas-jet nozzle 2A related to the spray nozzle 20A and the diameter of the jet hole 9 of the gas-jet nozzle 2B related to the spray nozzle 20B different from each other. The metal spray apparatus 230 in the figure has the diameter of a plurality of jet holes 9r belonging to the gas-jet nozzle 2A and the diameter of the plurality of jet holes 9 belonging to the gas-jet nozzle 2B, which diameters are made different from each other, unlike the first embodiment in which the same diameter of the jet holes 9 is used for the two gas-jet nozzles 2A and 2B. Specifically, the diameter of the plurality of jet holes 9r belonging to the gas-jet nozzle 2B is set larger than the diameter of the plurality of jet holes 9 belonging to the gas-jet nozzle 2A.

If the diameter of the plurality of jet holes 9r belonging to the gas-jet nozzle 2B (spray nozzle 20B) is made larger than the diameter of the plurality of jet holes 9 belonging to the gas-jet nozzle 2A (spray nozzle 20A) as illustrated in FIG. 13, the gas volume in the gas-jet nozzle 2B increases, and the particle size of a metal sprayed from the spray nozzle 20B is more refined as compared with the particle size of a metal sprayed from the spray nozzle 20A. That is, the larger the diameter of the jet hole 9 or 9r is, the more refined metal powders tend to be (in other words, the smaller the diameter of the jet hole 9 or 9r is, the more coarsened metal powders tend to be). Thereby, the particle size distributions of the metals sprayed from the two spray nozzles 20A and 20B with different diameters of the jet holes 9 and 9r become different from each other, and two peaks (average particle sizes µ1 and µ2) appear in the metal powder particle size distribution as illustrated in FIG. 17, for example. If the average particle size of metal powders sprayed from the spray nozzle 20A is defined as µ1 in FIG. 17, the average particle size of metal powders sprayed from the spray nozzle 20B is µ2 which is smaller than µ1. That is, similar to the case explained above in which Spray Condition (1) is modified, as compared with the case where the spray conditions of the spray nozzles 20A and 20B are the same (see FIG. 10), metal powders with a wide range of particle size can be produced at once.

A third example in FIG. 16 corresponds to the spray nozzle 20B in FIG. 13 obtained by modifying the comparative example (here, the spray nozzle 20A in the first embodiment) in terms of Spray Condition (3) explained above, and the diameter of the jet hole 9r is set to a value which is 2-fold of the diameter of the jet hole 9 in the comparative example. In this case, the particle size of metal powders formed by the spray nozzle 20B in the third example becomes finer as compared to the comparative example.

Spray Condition (4): The Numbers of the Jet Holes 9 at the Plurality of Gas-Jet Nozzles 2

A metal spray apparatus (not illustrated) related to the Spray Condition (4) has the number of the plurality of jet holes 9 belonging to the gas-jet nozzle 2A and the number of the plurality of jet holes 9r belonging to the gas-jet nozzle 2B, which numbers are made different from each other, unlike the first embodiment in which the same number of the jet holes 9 is used for the two gas-jet nozzles 2A and 2B. For example, there is a metal spray apparatus for which the number of the plurality of jet holes 9 belonging to the gas-jet nozzle 2B is set greater than the number of the plurality of jet holes 9 belonging to the gas-jet nozzle 2A. If the number of the plurality of jet holes 9 belonging to the gas-jet nozzle 2B (spray nozzle 20B) is made greater than the number of the plurality of jet holes 9 belonging to the gas-jet nozzle 2A (spray nozzle 20A) in this manner, the gas volume in the gas-jet nozzle 2B increases, and the particle size of a metal sprayed from the spray nozzle 20B is more refined as compared with the particle size of a metal sprayed from the spray nozzle 20A. That is, the greater the number of the jet holes 9 is, the more refined metal powders tend to be (in other words, the smaller the number of the jet holes 9 is, the more coarsened metal powders tend to be). Thereby, the particle size distributions of the metals sprayed from the two spray nozzles 20A and 20B with different numbers of jet holes 9 become different from each other, and two peaks (average particle sizes µ1 and µ2) appear in the metal powder particle size distribution as illustrated in FIG. 17, for example. If the average particle size of metal powders sprayed from the spray nozzle 20A is defined as µ1 in FIG. 17, the average particle size of metal powders sprayed from the spray nozzle 20B is µ2 which is smaller than µ1. That is, similar to the case explained above in which Spray Condition (1) is modified, as compared with the case where the spray conditions of the spray nozzles 20A and 20B are the same (see FIG. 10), metal powders with a wide range of particle size can be produced at once.

A fourth example in FIG. 16 corresponds to the spray nozzle 20B in the example explained above obtained by modifying the comparative example (here, the spray nozzle 20A in the first embodiment) in terms of Spray Condition (4) explained above, and the number of the jet holes 9 is set to a value which is 2-fold of the number of the jet holes 9 in the comparative example. In this case, the particle size of metal powders formed by the spray nozzle 20B in the fourth example becomes finer as compared to the comparative example.

Spray Condition (5): The Minimum Hole Diameter of the Liquid Nozzle 11 (Orifice Diameter)

Figure 14:
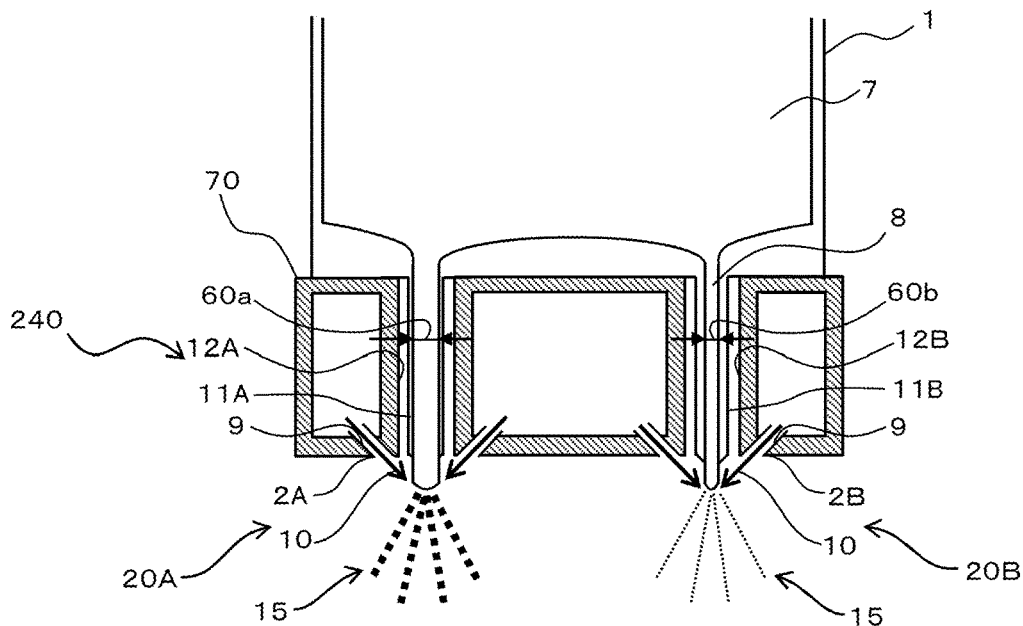
FIG. 14 is a cross-sectional view around one example of the metal spray apparatus of the gas atomizing apparatus according to the fifth embodiment.

FIG. 14 is a cross-sectional view around a metal spray apparatus 240 obtained by making the minimum hole diameter 60a of the first liquid nozzle 11A related to the spray nozzle 20A and the minimum hole diameter 60b of the second liquid nozzle 11B related to the spray nozzle 20B different from each other. The metal spray apparatus 240 in the figure has the minimum hole diameter 60a of the first liquid nozzle 11A and the minimum hole diameter 60b of the second liquid nozzle 11B, which minimum hole diameters are made different from each other, unlike the first embodiment in which the same minimum hole diameter is used for the two first liquid nozzles 11A and 11B. Specifically, the minimum hole diameter 60a of the first liquid nozzle 11A is set larger than the minimum hole diameter 60b of the second liquid nozzle 11B. Note that although the hole diameters of the two liquid nozzles 11A and 11B in FIG. 14 are constant along the axial direction, the minimum hole diameters of the liquid nozzles 11A and 11B may be set by providing orifices with smaller diameters than other portions in the holes, and the minimum hole diameters in this case match the orifice diameters.

If the minimum hole diameter 60a of the first liquid nozzle 11A (spray nozzle 20A) is made larger than the minimum hole diameter 60b of the second liquid nozzle 11B (spray nozzle 20B) as illustrated in FIG. 14 to increase the outflow metal amount per unit time, the particle size of a metal sprayed from the spray nozzle 20A is more coarsened as compared with the particle size of a metal sprayed from the spray nozzle 20B. That is, the larger the minimum hole diameters 60a and 60b are, the more coarsened metal powders tend to be (in other words, the smaller the minimum hole diameters 60a and 60b are, the more refined metal powders tend to be). Thereby, the particle size distributions of the metals sprayed from the two spray nozzles 20A and 20B with different minimum hole diameters 60a and 60b become different from each other, and two peaks (average particle sizes μ1 and μ2) appear in the metal powder particle size distribution as illustrated in FIG. 17, for example. If the average particle size of metal powders sprayed from the spray nozzle 20A is defined as μ1 in FIG. 17, the average particle size of metal powders sprayed from the spray nozzle 20B is μ2 which is smaller than μ1. That is, similar to the case explained above in which Spray Condition (1) is modified, as compared with the case where the spray conditions of the spray nozzles 20A and 20B are the same (see FIG. 10), metal powders with a wide range of particle size can be produced at once.

A fifth example in FIG. 16 corresponds to the spray nozzle 20A in FIG. 14 obtained by modifying the comparative example (here, the spray nozzle 20B in the first embodiment) in terms of Spray condition (5) explained above, and the minimum hole diameter 60a (orifice diameter) is set to a value increased to 1.5-fold of the value in the comparative example. In this case, the particle size of metal powders formed by the spray nozzle 20A in the fifth example becomes coarser as compared to the comparative example.

Spray Condition (6): The Tip Shape of the Liquid Nozzle 11

Figure 15A:
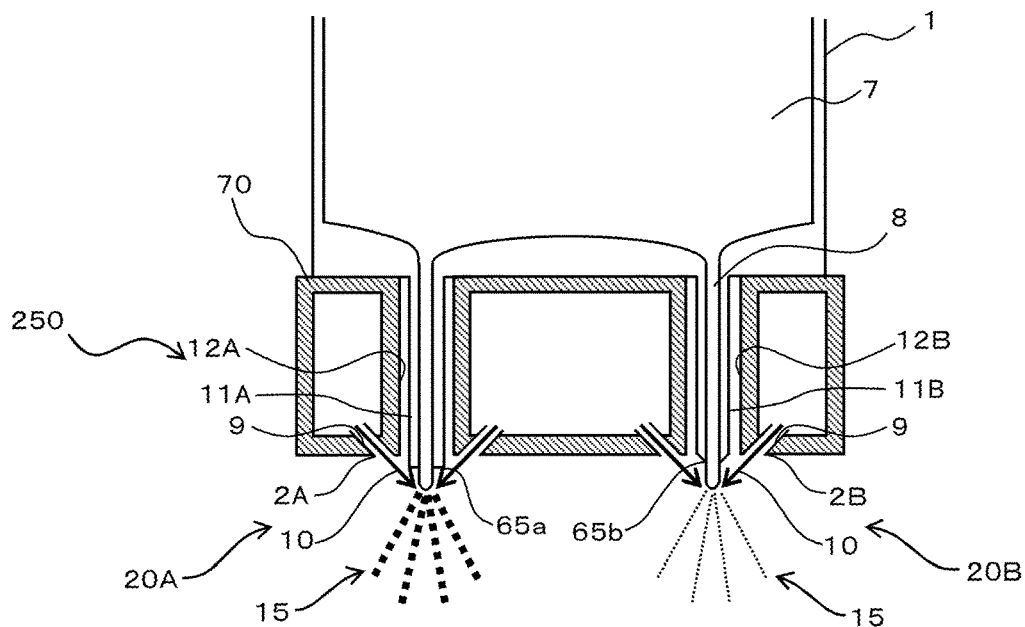
FIG. 15A is a cross-sectional view around one example of the metal spray apparatus of the gas atomizing apparatus according to the fifth embodiment.
Figure 15B:
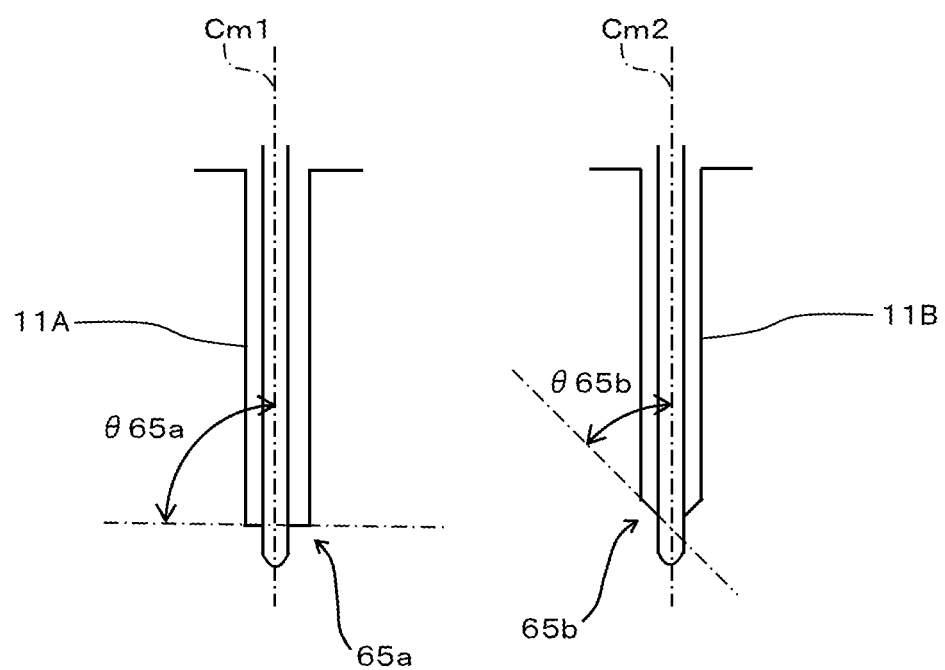
FIG. 15B illustrates enlarged views of liquid nozzles in one example of the metal spray apparatus of the gas atomizing apparatus according to the fifth embodiment.

FIG. 15A is a cross-sectional view around a metal spray apparatus 250 obtained by making a tip shape 65a of the first liquid nozzle 11A related to the spray nozzle 20A and a tip shape 65b of the second liquid nozzle 11B related to the spray nozzle 20B different from each other, and FIG. 15B is an enlarged view of the tip portions of the first and second liquid nozzles 11A and 11B. The metal spray apparatus 250 in these figures has the tip shape 65a of the first liquid nozzle 11A and the tip shape 65b of the second liquid nozzle 11B, which tip shapes are made different from each other, unlike the first embodiment in which the same tip shape is used for the two first liquid nozzles 11A and 11B. In the example illustrated in FIG. 15A and FIG. 15B, as tip shapes, the tip angles θ65a and θ65b of the liquid nozzles 11A and 11B are made different from each other. As illustrated in FIG. 15B, the tip angles θ65a and θ65b of the liquid nozzles 11A and 11B can be defined as the angles θ65a and θ65b that are each formed by the respective outline shapes of tip portions of the liquid nozzles 11A and 11B along their cross-sections in the axial direction and the respective central axes of the liquid nozzles 11A and 11B (the central axes Cm1 and Cm2 of the liquid-nozzle insertion holes 12A and 12B). In the example illustrated in FIG. 15A and FIG. 15B, the tip angle θ65a of the first liquid nozzle 11A is approximately 90 degrees, and is set to be larger than the tip angle θ65b of the second liquid nozzle 11B.

If the tip angle θ65a of the first liquid nozzle 11A (spray nozzle 20A) is made larger than the tip angle θ65b of the second liquid nozzle 11B (spray nozzle 20B) as illustrated in FIG. 15A, the particle size of a metal sprayed from the spray nozzle 20A is more coarsened as compared with the particle size of a metal sprayed from the spray nozzle 20B. That is, the larger the tip angles θ65a and θ65b are, the more coarsened metal powders tend to be (in other words, the smaller the tip angles θ65a and θ65b are, the more refined metal powders tend to be). Thereby, the particle size distributions of the metals sprayed from the two spray nozzles 20A and 20B with the different tip angles θ65a and θ65b become different from each other, and two peaks (average particle sizes μ1 and μ2) appear in the metal powder particle size distribution as illustrated in FIG. 17, for example. If the average particle size of metal powders sprayed from the spray nozzle 20A is defined as μ1 in FIG. 17, the average particle size of metal powders sprayed from the spray nozzle 20B is μ2 which is smaller than μ1. That is, similar to the case explained above in which Spray Condition (1) is modified, as compared with the case where the spray conditions of the spray nozzles 20A and 20B are the same (see FIG. 10), metal powders with a wide range of particle size can be produced at once.

A sixth example in FIG. 16 corresponds to the spray nozzle 20A in FIG. 15A and FIG. 15B obtained by modifying the comparative example (here, the spray nozzle 20B in the first embodiment) in terms of Spray Condition (6) explained above, and the tip angle θ65a is set to a value increased by 20 degrees from the value in the comparative example. In this case, the particle size of metal powders formed by the spray nozzle 20A in the sixth example becomes coarser as compared to the comparative example.

As mentioned above, by making the spray conditions of the plurality of spray nozzles 20A and 20B different from each other in the present embodiment, the particle size distribution of metal powders produced by a single gas atomizing apparatus can be adjusted as appropriate according to demands. That is, since it is possible to cause a plurality of peaks to appear in the particle size distribution and metal powders with a wide range of particle size distribution can be produced at once according to the present embodiment configured in the manner explained above, it is possible to flexibly cope with a wide range of customer demand.

Figure 18:
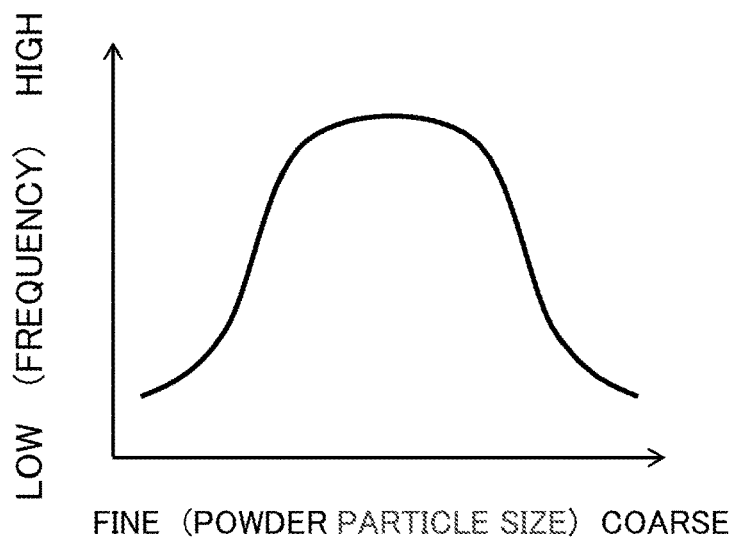
FIG. 18 is a distribution chart of the particle size of metal powders produced by one example of the gas atomizing apparatus in which different spray conditions are used for individual spray nozzles.

Note that although the example explained above mentions as an example the gas atomizing apparatus including the two spray nozzles 20A and 20B, it is needless to say that it becomes possible to adjust the particle size distribution by modifying spray conditions as appropriate also in a gas atomizing apparatus including three or more spray nozzles. For example, if spray conditions are set in a gas atomizing apparatus including three or more spray nozzles such that metal powders with different average particle sizes can be produced with the individual spray nozzles, it is also possible to adjust the particle size distribution such that it becomes a flat distribution with reduced skewness by causing a plurality of peaks to consecutively overlap as illustrated in FIG. 18.

In addition, although cases in which the six Spray Conditions (1) to (6) presented as examples are modified one by one are explained above, two or more of the six Spray Conditions (1) to (6) may be combined as appropriate to be used as the spray conditions of the one spray nozzle 20. That is, the spray conditions of the plurality of spray nozzles 20 can be modified in terms of at least one of Spray Conditions (1) to (6) explained above. That is, the plurality of liquid nozzles 11 include a liquid nozzle 11 which is different from other liquid nozzles 11 in terms of at least one of minimum hole diameter and tip shape in some cases, and the plurality of gas-jet nozzles 2 include a gas-jet nozzle 2 which is different from other gas-jet nozzles 2 in terms of at least one of gas-fluid jet pressure, jet hole angles, jet hole diameters, and the numbers of jet holes in some cases.

<Others>

The present invention is not limited to the embodiments explained above, but include various modification examples that fall within a range not deviating from the gist of the present invention. For example, the present invention is not limited to ones including all the configurations explained in the embodiments described above, but include ones from which some of the configurations are deleted. In addition, some of configurations related to a certain embodiment may be added to or replace configurations related to another embodiment.

Although the two spray nozzles 20A and 20B are provided for one spray chamber in the embodiments explained above, there are no problems even if the number of the spray nozzles 20A and 20B is increased to three or more.

In addition, although the cases where gases (gas fluids) are jetted from the gas-jet nozzles 2A and 2B are explained, there are no problems even if liquids such as water are jetted. That is, there is a possibility that the present invention can be applied as long as the nozzles are ones that jet a fluid.

DESCRIPTION OF REFERENCE CHARACTERS

Cg0: Central axis of metal spray apparatus 200
Cm1, Cm2: Central axis of liquid-nozzle insertion hole
Pg1, Pg2: Center point of inverted-cone bottom surface
Tc1, Tc2: Tilt center
1: Melting chamber
2A, 2B: Gas-jet nozzle
3: Jet-gas supply pipe
4: Spray chamber
5: Hopper
6: Exhaust air
7: Melted metal (liquid)
8: Liquid flow
9: Jet hole
10: Jet-gas jet
11A, 11B: Liquid nozzle
12: Liquid-nozzle insertion hole
15: Fine particle
20A, 20B: Spray nozzle
21: Open end of liquid nozzle
25: Gas-jet direction (jet-hole central axis)
26: Focus
27: Liquid flow-down area
30A, 30B: Seal-gas jet flow nozzle
31: Jet hole
32: Slit
35: Film-like jet flow (air curtain)
41: Straight line (focus direction)
45: Circular surface
46: Circular surface
50: Gas flow path
70: Gas jet device
90: Circle formed by jet holes 9
200: Metal spray apparatus

The invention claimed is:

1. A metal-powder producing apparatus comprising:
a spray chamber; and
a plurality of spray nozzles that liquid-spray a melted metal into the spray chamber, wherein
each of the plurality of spray nozzles includes:
a liquid nozzle that allows the melted metal to flow down vertically downward into the spray chamber; and
a gas-jet nozzle that has a plurality of jet holes arranged around the liquid nozzle and causing a gas fluid to collide with the melted metal having flowed down from the liquid nozzle, and
in at least one spray nozzle among the plurality of spray nozzles, a focus of a gas fluid jetted from the plurality of jet holes is positioned in a flow-down area of a melted metal that is allowed to flow down from the liquid nozzle, such that the gas fluid forms a film having an inverted-cone shape with a vertex of the inverted-cone coinciding with the focus, and a central axis of the liquid nozzle is positioned on an inner-surface side of the spray chamber relative to a center of a circle formed by jet holes of the plurality of gas-jet nozzles to an extent that the liquid nozzle does not overlap the plurality of gas-jet nozzles.

2. The metal-powder producing apparatus according to claim 1, comprising:
one crucible portion in which a melted metal is accumulated; and
a gas jet device installed below the one crucible portion, wherein
a plurality of the liquid nozzles extend downward from a bottom portion of the one crucible portion,
the gas jet device has a plurality of liquid-nozzle insertion holes, and a gas flow path that forms gas flows around each of the plurality of liquid-nozzle insertion holes, and
the jet holes are formed at a bottom surface of the gas jet device and around an open end of each of the plurality of liquid-nozzle insertion holes.

3. The metal-powder producing apparatus according to claim 1, further comprising:
a seal-gas jet flow nozzle that is provided between two adjacent spray nozzles among the plurality of spray nozzles, and jets a gas fluid to form a jet flow for suppressing collision between melted metals sprayed from the two spray nozzles.

4. The metal-powder producing apparatus according to claim 3, wherein
the seal-gas jet flow nozzle includes a plurality of holes each of which jets a gas fluid, and
the plurality of holes are arranged linearly between the two spray nozzles.

5. The metal-powder producing apparatus according to claim 3, wherein
the seal-gas jet flow nozzle includes slits each of which jets a gas fluid, and the slit is arranged between the two spray nozzles.

6. The metal-powder producing apparatus according to claim 1, wherein
spray conditions of the plurality of spray nozzles are different from each other in terms of at least one of jet pressure of a gas fluid jetted from the plurality of gas-jet nozzles, jet hole angles at the plurality of gas-jet nozzles, jet hole diameters at the plurality of gas-jet nozzles, the numbers of jet holes at the plurality of gas-jet nozzles, minimum hole diameters of the liquid nozzles, and tip shapes of the liquid nozzles.

7. A gas jet device of a metal-powder producing apparatus, comprising:
a plurality of liquid-nozzle insertion holes into which liquid nozzles through which a melted metal flows down vertically downward are inserted;
a gas flow path that forms gas flows around each of the plurality of liquid-nozzle insertion holes; and
a gas-jet nozzle that is provided for each of the plurality of liquid-nozzle insertion holes and jets a gas flowing in the gas flow path toward an outside of the gas jet device from an open end of the liquid-nozzle insertion hole, wherein
the gas-jet nozzles include a plurality of jet holes formed at a bottom surface of the gas jet device and around the open end of the liquid-nozzle insertion holes, and
in at least one spray nozzle among a plurality of spray nozzles, a focus of a gas fluid jetted from the jet holes is positioned in a flow-down area of a melted metal that is allowed to flow down from the liquid nozzle, such that the gas fluid forms a film having an inverted-cone shape with a vertex of the inverted-cone coinciding with the focus, and a central axis of the liquid nozzle is positioned on an inner-surface side of a spray chamber relative to a center of a circle formed by jet holes of the gas-jet nozzles to an extent that the liquid nozzle does not overlap the gas-jet nozzles.

8. A crucible container of a metal-powder producing apparatus, comprising:
one crucible portion in which a melted metal is accumulated; and
a plurality of liquid nozzles that extend vertically downward from a bottom portion of the one crucible portion, and form liquid flow paths through which the melted metal flows down vertically downward from the bottom portion of the one crucible portion, wherein
the liquid nozzles are inserted into the liquid-nozzle insertion holes of the gas jet device according to claim 7.

9. The gas jet device according to claim 7, wherein
the gas-jet nozzles each provided for a corresponding one of the plurality of liquid-nozzle insertion holes include a gas-jet nozzle that is different from other gas-jet nozzles in terms of at least one of gas-fluid jet pressure, jet hole angles, jet hole diameters, and the numbers of jet holes.

10. The gas jet device according to claim 7, comprising:
a seal-gas jet flow nozzle provided at a bottom surface of the gas jet device, the seal-gas jet flow nozzle being provided between two adjacent liquid-nozzle insertion holes among the plurality of liquid-nozzle insertion holes and jetting a gas fluid to form a jet flow for suppressing collision between melted metals that are allowed to flow down from the plurality of liquid nozzles.

* * * * *